United States Patent Office 3,213,001
Patented Oct. 19, 1965

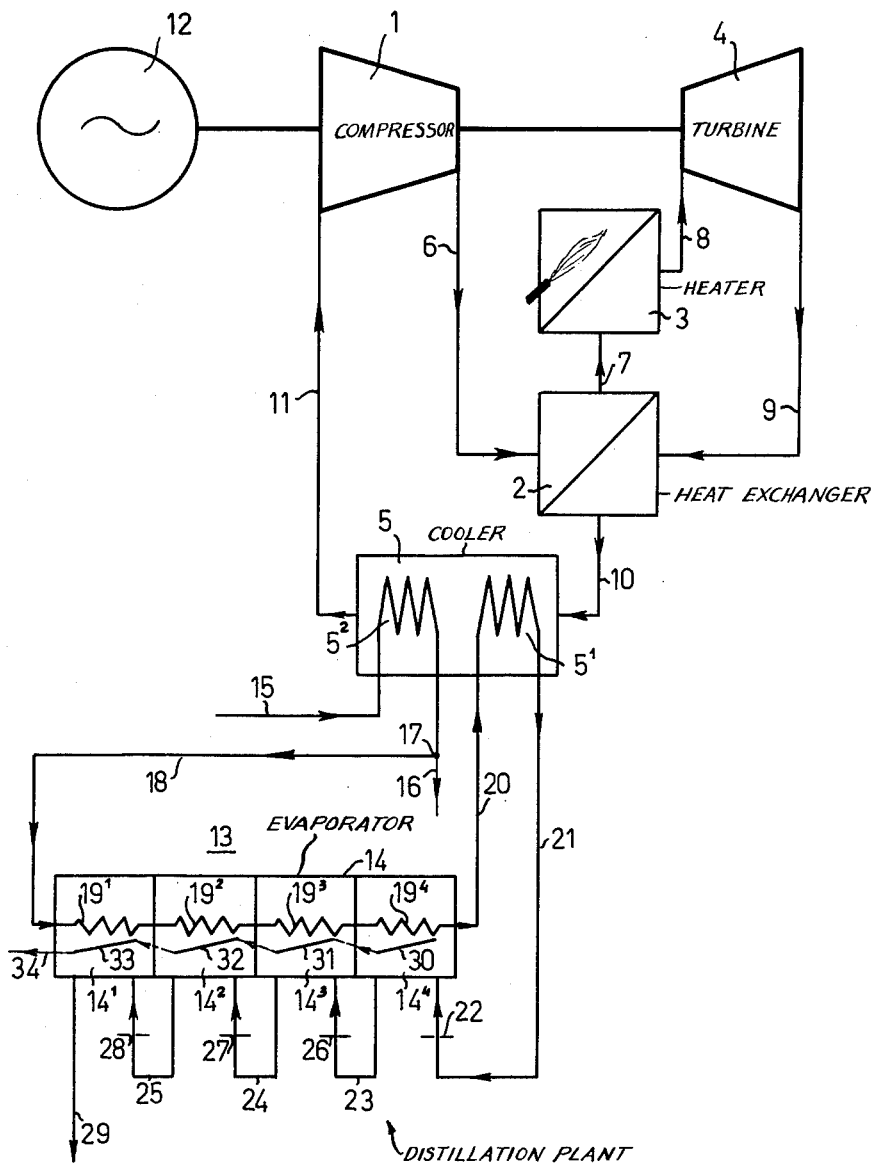

3,213,001
CLOSED-CIRCUIT THERMAL POWER PLANT AND
FLASH DISTILLATION UNIT
David Schmidt, Zurich, Switzerland, assignor to Escher
Wyss Aktiengesellschaft, Zurich, Switzerland, a corporation of Switzerland
Filed July 24, 1962, Ser. No. 212,010
Claims priority, application Switzerland, Aug. 25, 1961,
9,921/61
3 Claims. (Cl. 202—173)

This invention relates to a closed-circuit thermal power plant with circulation of a gaseous working medium and an arrangement for utilizing waste heat given off by the working medium in a cooler. In a known thermal power plant of this kind, the cooler has two parts, through which the working medium to be cooled flows serially, the cooler part through which the working medium flows first being used for the supply of useful heat, while after-cooling of the working medium occurs in the second cooler part.

In the thermal power plant according to the invention, the cooler also has at least two parts, through which the working medium to be cooled flows serially, and the invention consists in that said cooler is connected to a distillation plant with expansion evaporator in such a manner that the fluid to be distilled receives its final heating before expansion in the cooler part through which the working medium flows first.

In this way, the waste heat of the thermal power plant can be used advantageously for distillation purposes. Combination with a distillation plant with expansion evaporator renders possible economic utilization of the heat produced in closed-circuit thermal power plants with circulation of a gaseous working medium partly with a temperature below 100° C.

If the distillation plant is intended for the distillation of sea water, the sea water to be distilled is advantageously allowed to flow first through that part of the cooler which follows after in respect of the working medium and thereupon to absorb heat in the expansion evaporator, before receiving its final heating in the cooler part through which the working medium flows first.

A constructional example of the subject of the invention is represented in a simplified manner in the drawing.

A closed-circuit thermal power plant with circulation of a gaseous working medium, preferably air, has a compressor 1, a heat exchanger 2, a heater 3, a turbine 4 and a cooler 5. The compressed working medium passes from the compressor 1 through a pipe 6 to the heat exchanger 2 and thence through a pipe 7 to the heater 3, in which it is heated by the supply of heat from outside. The working medium thus heated passes through a pipe 8 to the turbine 4, in which it is expanded while doing work. The expanded working medium is passed through a pipe 9 to the heat exchanger 2 in which it gives off heat to the compressed working medium entering through the pipe 6. The expanded working medium then passes through a pipe 10 to the cooler 5 and thence through a pipe 11 to the suction side of the compressor 1, thus closing the circuit. The turbine 4 drives the compressor 1 and at the same time delivers useful power to an electric current generator 12.

The cooler 5 consists of two parts $5^1$ and $5^2$ arranged in series with respect to the working medium flowing through.

The cooler 5 is connected to a distillation plant 13 with expansion evaporator 14 in such a manner that the fluid to be distilled receives its final heating before expansion in the cooler part $5^1$, through which the working medium flows first. The expansion evaporator 14 has four expansion stages or chambers $14^1$, $14^2$, $14^3$ and $14^4$.

The plant shown may be for example, a plant for the distillation of sea water. The cooler part $5^2$ has fresh sea water sent through it, this sea water entering by a pipe 15 and serving for the after-cooling of the working medium of the thermal power plant. The larger portion of the sea water leaving the cooler part $5^2$ is discharged through a pipe 16.

Branching off this pipe 16 at a point 17 is a pipe 18, which leads the residue of the sea water, i.e. the fluid to be distilled, to the distillation plant. This part of the sea water flows serially through the cooling coils $19^1$, $19^2$, $19^3$, $19^4$, associated with the individual chambers $14^1$, $14^2$, $14^3$, $14^4$ of the expansion evaporator 14. The sea water to be distilled then passes through a pipe 20 to the cooler part $5^1$, in which it receives its final heating and flows through a pipe 21 and throttle 22 to the chamber $14^4$ of the expansion evaporator.

The sea water flows through further pipes 23, 24, 25 with throttles 26, 27, 28 successively from the chamber $14^4$ to the chambers $14^3$, $14^2$, $14^1$ and is finally discharged through a pipe 29. After each throttle, some of the sea water evaporates, the temperature of the water being reduced at the same time. The steam is deposited on the cooling coils $19^4$, $19^3$, $19^2$, $19^1$, and the resulting condensate, i.e. the distilled water, collects in troughs 30, 31, 32, and 33 and is discharged through a pipe 34.

The working air may, for example, enter the cooler 5 through the pipe 10 at a temperature of 130° C. and leave this cooler 5 through the pipe 11 at a temperature of 35° C. A calculated example for the distillation of sea water furthermore gave the following results:

The sea water arriving at 25° C. is heated in the cooler part $5^2$ to 35° C. The part of the sea water branched off to the distillation plant is heated in the cooling coils $19^1$, $19^2$, $19^3$, $19^4$ by the condensing steam to 70° C. and finally on leaving the cooler part $5^1$ has a temperature of 90° C. The temperature of the working air between the two cooler parts $5^1$ and $5^2$ is 80° C. The throttles 22, 26, 27, 28 are so adjusted that the pressures are 0.1 kg./cm.² abs., 0.2 kg./cm.² abs., 0.35 kg./cm.² abs. and 0.5 kg./cm.² abs. and the distilled water flows away through the pipe 34 at a temperature of 45° C.

In the constructional example shown, the cooler 5 is the working medium cooler connected in front of the compressor 1. In the same way, however, without departing from the principle of the invention, the heat given off in an intermediate cooler of the compressor of the gas-turbine plant may be utilized for distillation purposes.

What is claimed is:
1. In combination a closed-circuit thermal power plant operating with a gaseous working medium, comprising compressing means, heating means and turbine means connected to be serially traversed by the working medium in the order stated, and an arrangement for utilizing waste heat given off by the working medium for distillation of a fluid, said arrangement comprising a cooler for the working medium having at least two parts arranged to be traversed in series by the working medium; a distillation plant having an expansion evaporator including at least one expansion chamber; flow connections defining a first flow path for the fluid to be distilled leading first through that cooler part which is first traversed by the working medium, and then into the expansion chamber, so that the said fluid receives its final heating in said last named cooler part by heat given off by the working medium before expansion in the evaporator; and flow connections defining a second flow path for leading a coolant through a cooler part other than that part which is first traversed by the working medium, whereby the rate of flow of the coolant is independent of the rate of flow of the fluid to be distilled.

2. In combination a closed-circuit thermal power plant operating with a gaseous working medium, comprising compressing means, heating means and turbine means connected to be serially traversed by the working medium in the order stated, and an arrangement for utilizing waste heat given off by the working medium for distillation of sea water, said arrangement comprising a cooler for the working medium having at least a first and a second part traversed in series by the working medium in the order stated; a distillation plant having an expansion evaporator including at least one expansion chamber; flow connections defining a first flow path for the sea water to be distilled leading first through said second cooler part, then through the expansion evaporator, then through said first cooler part, and then into the expansion chamber, so that the sea water to be distilled receives first heat given off by the working medium in said second cooler part, then absorbs heat from the sea water condensing in the expansion chamber and, before expansion, receives its final heating by heat given off by the working medium in said first cooler part; and flow connections defining a second flow path for leading coolant through said second cooler part, whereby the rate of flow of coolant is independent of the rate of flow of sea water to be distilled.

3. The combination defined in claim 2 in which the second flow path branches off the first flow path between the second cooler part and the expansion evaporator, whereby the two flow paths have a common portion upstream of their junction.

References Cited by the Examiner
UNITED STATES PATENTS

| | | | |
|---|---|---|---|
| 2,759,882 | 8/56 | Worthen et al. | 202—45 |
| 2,893,926 | 7/59 | Worthen et al. | 202—82 |
| 2,908,618 | 10/59 | Bethon | 202—45 X |

FOREIGN PATENTS

| | | |
|---|---|---|
| 935,236 | 2/48 | France. |

NORMAN YUDKOFF, *Primary Examiner.*

JULIUS E. WEST, *Examiner.*